United States Patent
Zielinski et al.

(10) Patent No.: US 10,472,542 B2
(45) Date of Patent: Nov. 12, 2019

(54) POLYURETHANE COATINGS FOR DIRECT APPLICATION TO POLYURETHANE PULTRUSION

(71) Applicant: Covestro LLC, Pittsburgh, PA (US)

(72) Inventors: David P. Zielinski, Cranberry Township, PA (US); Derick Henderson, Crafton, PA (US); Mark Conner, Kempton, PA (US)

(73) Assignee: Covestro LLC, Pittsburgh, PA (US)

( * ) Notice: Subject to any disclaimer, the term of this patent is extended or adjusted under 35 U.S.C. 154(b) by 107 days.

(21) Appl. No.: 15/724,634

(22) Filed: Oct. 4, 2017

(65) Prior Publication Data

US 2019/0100675 A1    Apr. 4, 2019

(51) Int. Cl.

| | |
|---|---|
| C09D 175/06 | (2006.01) |
| C08G 18/12 | (2006.01) |
| C08G 18/73 | (2006.01) |
| C08G 18/75 | (2006.01) |
| C08G 18/77 | (2006.01) |
| C08G 18/38 | (2006.01) |
| C08G 18/42 | (2006.01) |
| C08G 18/66 | (2006.01) |
| C08J 7/04 | (2006.01) |
| B05D 1/26 | (2006.01) |
| B05D 1/28 | (2006.01) |
| C08G 18/71 | (2006.01) |
| C08G 18/72 | (2006.01) |
| C08G 18/24 | (2006.01) |
| C08G 18/28 | (2006.01) |

(52) U.S. Cl.
CPC ............. *C09D 175/06* (2013.01); *B05D 1/28* (2013.01); *C08G 18/12* (2013.01); *C08G 18/24* (2013.01); *C08G 18/289* (2013.01); *C08G 18/3893* (2013.01); *C08G 18/4202* (2013.01); *C08G 18/4238* (2013.01); *C08G 18/4244* (2013.01); *C08G 18/66* (2013.01); *C08G 18/718* (2013.01); *C08G 18/722* (2013.01); *C08G 18/73* (2013.01); *C08G 18/753* (2013.01); *C08G 18/778* (2013.01); *C08J 7/047* (2013.01); *C08J 2375/06* (2013.01)

(58) Field of Classification Search
CPC ...... C08G 18/12; C08G 18/24; C08G 18/289; C08G 18/3893; C08G 18/4202; C08G 18/4238; C08G 18/4244; C08G 18/66; C08G 18/718; C08G 18/722; C08G 18/73; C08G 18/753; C08G 18/778; C08J 2375/06; C08J 7/047; C09D 175/06; B05D 1/28; B32B 27/40
USPC ......................................... 428/423.3; 524/589
See application file for complete search history.

(56) References Cited

U.S. PATENT DOCUMENTS

| | | |
|---|---|---|
| 5,717,091 A | 2/1998 | Richter et al. |
| 2004/0106726 A1 | 6/2004 | Joshi et al. |
| 2004/0234773 A1 | 11/2004 | Setiabudi |
| 2005/0215701 A1* | 9/2005 | Porsch ................... C08G 18/10 524/589 |
| 2008/0171210 A1* | 7/2008 | Rukavina .......... B32B 17/10036 428/429 |
| 2009/0255197 A1* | 10/2009 | Chapman .................. E06B 3/20 52/210 |
| 2010/0151366 A1* | 6/2010 | Nukada ................ G03G 5/0614 430/56 |
| 2016/0108168 A1* | 4/2016 | Harasin ................. B29C 70/521 428/423.1 |
| 2017/0036428 A1* | 2/2017 | Richards ................. B32B 27/08 |

FOREIGN PATENT DOCUMENTS

| | | |
|---|---|---|
| WO | 0247462 A2 | 6/2002 |
| WO | 2016210237 A1 | 12/2016 |

\* cited by examiner

*Primary Examiner* — Thao T Tran
(74) *Attorney, Agent, or Firm* — John E. Mrozinski, Jr.

(57) ABSTRACT

The present invention provides a polyurethane coating composition comprising a fluorosurfactant, a silane adhesion promoter, and a silane modified polyisocyanate, wherein the composition has excellent substrate wet-out and adhesion under direct wet-on-hot and cold spray applications. The coating composition is particularly well suited to use with polyurethane pultrusion composites.

6 Claims, No Drawings

POLYURETHANE COATINGS FOR DIRECT APPLICATION TO POLYURETHANE PULTRUSION

FIELD OF THE INVENTION

The present invention relates in general, to pultrusion and more specifically, to polyurethane-based coatings useful for pultrusion processes.

BACKGROUND OF THE INVENTION

Pultrusion is a manufacturing process for producing continuous lengths of fiber reinforced plastic ("FRP") structural shapes. Raw materials include a liquid resin mixture (containing resin, fillers and specialized additives) and reinforcing fibers. The process involves pulling these raw materials, rather than pushing as is the case in extrusion, through a heated steel forming die using a continuous pulling device. The reinforcement materials are in continuous forms such as rolls of fiberglass mat or doffs of fiberglass roving. The two ways to impregnate, or "wet out", the glass are open bath process and resin injection. Typical commercial resins include polyester, vinyl esters, phenolics, and epoxy compounds. These resins usually have very long gel times and can be run in an open bath process wherein the reinforcing fibers are soaked in a bath of resin and the excess resin is scraped off by a series of preform plates and at the die entrance. As the wetted fibers enter the die, the excess resin is squeezed through and off the reinforcing fibers. The pressure rise in the die inlet helps to enhance fiber wet-out and suppresses void formation. As the saturated reinforcements are pulled through the die, the gelation (or hardening) of the resin is initiated by the heat from the die and a rigid, cured profile is formed that corresponds to the shape of the die.

For resin systems like polyurethanes, which have a fast gel time and a short pot life the resin injection process is used. In the injection process, the reinforcement materials are passed through a small closed box which is usually attached to the die or may be part of the die. The resin is injected, under pressure through ports in the box, to impregnate the reinforcement materials. Resin injection boxes are designed to minimize resin volume and resin residence time inside the box. There are a number of different resin injection box designs in the literature all of which have the common features of an angled or tapered design and the exit profile matching the shape of the die entrance.

Polyurethane pultrusion has struggled to gain market acceptance because it is not light stable, and therefore requires a protective coating. Pultruded polyurethane articles have proven difficult substrates to coat due to high surface hardness and low surface tension resulting from the presence of an internal mold release ("IMR") at the surface.

Numerous attempts have been made by workers in the art to find a suitable coating and coating process for protecting polyurethane-based pultruded composites. Each coating required a primer to achieve the targeted adhesion specification. Pultruders prefer that no substrate pretreatment, such as solvent wash, flame or plasma treatment, be used, due to increased processing time and costs.

Therefore, a need exists in the art for a pultrusion coating which adheres directly to unprepared polyurethane pultruded composites, thus eliminating the need for substrate pretreatment.

SUMMARY OF THE INVENTION

Accordingly, the present invention reduces or eliminates problems inherent in the art by providing a polyurethane coating system that includes a fluoro-surfactant, silane adhesion promoter and a silane modified polyisocyanate to achieve excellent substrate wet-out and adhesion under both direct wet-on-hot and cold spray applications. In certain embodiments, the invention provides a polyurethane coating base composition, which is a high solids polyester polyol (<60% solids, more preferably, <70% solids, <80% solids, up to and including 100% solids, in all instances by weight) and a combination of hexamethylene diisocyanate ("HDI") and 1-isocyanato-3,3,5-trimethyl-5-isocyanatomethyl-cyclohexane ("IPDI") homopolymers that physically and chemically dries quickly enough to withstand the puller force of pultrusion. Although this coating system performs well under such conditions, other embodiments of system exhibit excellent adhesion when coated on a cold substrate even after the substrate has aged for some time.

In one aspect, the invention is directed to a polyurethane coating composition comprising a fluorosurfactant, a silane adhesion promoter, and a silane modified polyisocyanate, wherein the composition has excellent substrate wet-out and adhesion under direct wet-on-hot and cold spray applications.

In other aspects, the invention is directed to a method of making a polyurethane coating composition comprising reacting a fluorosurfactant, a silane adhesion promoter, and a silane modified polyisocyanate.

In another aspect, the invention is directed to a substrate coated with a polyurethane coating composition comprising a fluorosurfactant, a silane adhesion promoter, and a silane modified polyisocyanate, wherein the composition has excellent substrate wet-out and adhesion under direct wet-on-hot and cold spray applications.

In yet other aspects, the invention is directed to a polyurethane pultrusion composite coated with a polyurethane coating composition comprising a fluorosurfactant, a silane adhesion promoter, and a silane modified polyisocyanate, wherein the composition has excellent substrate wet-out and adhesion under direct wet-on-hot and cold spray applications.

It is understood that the invention disclosed and described in this specification is not limited to the embodiments summarized in this Summary.

DETAILED DESCRIPTION OF THE INVENTION

The present invention will now be described for purposes of illustration and not limitation. Except in the operating examples, or where otherwise indicated, all numbers expressing quantities, percentages, and so forth in the specification are to be understood as being modified in all instances by the term "about."

Any numerical range recited in this specification is intended to include all sub-ranges of the same numerical precision subsumed within the recited range. For example, a range of "1.0 to 10.0" is intended to include all sub-ranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited in this specification is intended to include all lower numerical limitations subsumed therein and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein. All such ranges are intended to be inherently described in this specification such that amending to expressly recite any such sub-ranges would comply with the requirements of 35 U.S.C. § 112(a), and 35 U.S.C. § 132(a).

Any patent, publication, or other disclosure material identified herein is incorporated by reference into this specification in its entirety unless otherwise indicated, but only to the extent that the incorporated material does not conflict with existing definitions, statements, or other disclosure material expressly set forth in this specification. As such, and to the extent necessary, the express disclosure as set forth in this specification supersedes any conflicting material incorporated by reference herein. Any material, or portion thereof, that is said to be incorporated by reference into this specification, but which conflicts with existing definitions, statements, or other disclosure material set forth herein, is only incorporated to the extent that no conflict arises between that incorporated material and the existing disclosure material. Applicant reserves the right to amend this specification to expressly recite any subject matter, or portion thereof, incorporated by reference herein.

Reference throughout this specification to "various non-limiting embodiments," "certain embodiments," or the like, means that a particular feature or characteristic may be included in an embodiment. Thus, use of the phrase "in various non-limiting embodiments," "in certain embodiments," or the like, in this specification does not necessarily refer to a common embodiment, and may refer to different embodiments. Further, the particular features or characteristics may be combined in any suitable manner in one or more embodiments. Thus, the particular features or characteristics illustrated or described in connection with various or certain embodiments may be combined, in whole or in part, with the features or characteristics of one or more other embodiments without limitation. Such modifications and variations are intended to be included within the scope of the present specification.

The grammatical articles "a", "an", and "the", as used herein, are intended to include "at least one" or "one or more", unless otherwise indicated, even if "at least one" or "one or more" is expressly used in certain instances. Thus, these articles are used in this specification to refer to one or more than one (i.e., to "at least one") of the grammatical objects of the article. By way of example, and without limitation, "a component" means one or more components, and thus, possibly, more than one component is contemplated and may be employed or used in an implementation of the described embodiments. Further, the use of a singular noun includes the plural, and the use of a plural noun includes the singular, unless the context of the usage requires otherwise.

In certain embodiments, the invention is directed to a polyurethane coating composition comprising a fluorosurfactant, a silane adhesion promoter, and a silane modified polyisocyanate, wherein the composition has excellent substrate wet-out and adhesion under direct wet-on-hot and cold spray applications.

In various embodiments, the invention is directed to a method of making a polyurethane coating composition comprising reacting a fluorosurfactant, a silane adhesion promoter, and a silane modified polyisocyanate.

In other embodiments, the invention is directed to a substrate coated with a polyurethane coating composition comprising a fluorosurfactant, a silane adhesion promoter, and a silane modified polyisocyanate, wherein the composition has excellent substrate wet-out and adhesion under direct wet-on-hot and cold spray applications.

In some embodiments, the invention is directed to a polyurethane pultrusion composite coated with a polyurethane coating composition comprising a fluorosurfactant, a silane adhesion promoter, and a silane modified polyisocyanate, wherein the composition has excellent substrate wet-out and adhesion under direct wet-on-hot and cold spray applications.

As used herein, the term "polymer" encompasses pre-polymers, oligomers and both homopolymers and copolymers; the prefix "poly" in this context referring to two or more. As used herein, the term "molecular weight", when used in reference to a polymer, refers to the number average molecular weight ($M_n$), unless otherwise specified.

As used herein, the term "coating composition" refers to a mixture of chemical components that will cure and form a coating when applied to a substrate. As used herein, the term "binder" refers to the component of a two-component coating composition that comprises an isocyanate-reactive resin. As used herein, the terms "hardener" and "crosslinker" are synonymous and refer to the component of a two-component coating composition that comprises a polyisocyanate.

As indicated, the coating compositions of the present invention comprise a polyisocyanate. As used herein, the term "polyisocyanate" refers to compounds comprising at least two unreacted isocyanate groups, such as three or more unreacted isocyanate groups. The polyisocyanate may comprise diisocyanates such as linear aliphatic polyisocyanates, cycloaliphatic polyisocyanates and alkaryl polyisocyanates.

Suitable polyisocyanates include, for example, low molecular weight polyisocyanates having a molecular weight of 168 to 300, such as hexamethylene diisocyanate (HDI), pentamethylene diisocyanate (PDI), 2,2,4- and/or 2,4,4-trimethyl-1,6-hexamethylene diisocyanate, dodecamethylene diisocyanate, 1,4-diisocyanatocyclohexane, 1-isocyanato-3,3,5-trimethyl-5-isocyanatomethylcyclohexane (IPDI), 2,4'- and/or 4,4'-diisocyanato-dicyclohexyl methane, methylene dicyclohexyl diisocyanate or hydrogenated MDI (HMDI). In certain embodiments, the aliphatic polyisocyanate is a combination of hexamethylene diisocyanate (HDI) and 1-isocyanato-3,3,5-trimethyl-5-isocyanatomethyl-cyclohexane (IPDI) homopolymers.

In some embodiments, the polyisocyanate comprises a derivative of any of the foregoing monomeric polyisocyanates, such as a derivative containing one or more of biuret groups, isocyanurate groups, urethane groups, carbodiimide groups, and allophanate groups.

Specific examples of suitable modified polyisocyanates include N,N',N"-tris-(6-isocyanatohexyl)-biuret and mixtures thereof with its higher homologues and N,N',N"-tris-(6-isocyanatohexyl)-isocyanurate and mixtures thereof with its higher homologues containing more than one isocyanurate ring.

Isocyanate group-containing prepolymers and semi-prepolymers based on the monomeric simple or modified polyisocyanates exemplified above and organic polyhydroxyl compounds are also suitable for use as a polyisocyanate in the coating compositions of the present invention. These prepolymers and semi-prepolymers often have an isocyanate content of 0.5% to 30% by weight, such as 1% to 20% by weight or 10% to 20% by weight, and can be prepared, for example, by reaction of polyisocyanate(s) with polyhydroxyl compound(s) at an NCO/OH equivalent ratio of 1.05:1 to 10:1, such as 1.1:1 to 3:1, this reaction may be followed by distillative removal of any unreacted volatile starting polyisocyanates still present.

The prepolymers and semi-prepolymers may be prepared, for example, from low molecular weight polyhydroxyl compounds having a molecular weight of 62 to 299, specific examples of which include, but are not limited to, ethylene glycol, propylene glycol, trimethylol propane, 1,6-dihydroxy hexane; low molecular weight, hydroxyl-containing esters of these polyols with dicarboxylic acids; low molecular weight ethoxylation and/or propoxylation products of these polyols; and mixtures of the preceding polyvalent modified or unmodified alcohols.

In certain embodiments, the prepolymers and semi-prepolymers are prepared from a relatively high molecular weight polyhydroxyl compound having a molecular weight of 300 to 8,000, such as 1,000 to 5,000, as determined from the functionality and the OH number. These polyhydroxyl compounds have at least two hydroxyl groups per molecule and generally have a hydroxyl group content of 0.5% to 17% by weight, such as 1% to 5% by weight.

Examples of suitable relatively high molecular weight polyhydroxyl compounds which may be used for the preparation of the prepolymers and semi-prepolymers include polyester polyols based on the previously described low molecular weight, monomeric alcohols and polybasic carboxylic acids such as adipic acid, sebacic acid, phthalic acid, isophthalic acid, tetrahydrophthalic acid, hexahydrophthalic acid, maleic acid, the anhydrides of these acids and mixtures of these acids and/or acid anhydrides. Hydroxyl group-containing polylactones, especially poly-ε-caprolactones, are also suitable for the preparation of the prepolymers and semi-prepolymers.

Polyether polyols, which can be obtained by the alkoxylation of suitable starting molecules, are also suitable for the preparation of the isocyanate group-containing prepolymers and semi-prepolymers. Examples of suitable starting molecules for the polyether polyols include the previously described monomeric polyols, water, organic polyamines having at least two NH bonds and any mixtures of these starting molecules. Ethylene oxide and/or propylene oxide are exemplary suitable alkylene oxides for the alkoxylation reaction. These alkylene oxides may be introduced into the alkoxylation reaction in any sequence or as a mixture.

Also suitable for the preparation of the prepolymers and semi-prepolymers are hydroxyl group-containing polycarbonates which may be prepared by the reaction of the previously described monomeric diols with phosgene and diaryl carbonates such as diphenyl carbonate.

In certain embodiments, the polyisocyanate comprises an asymmetric diisocyanate trimer (iminooxadiazine dione ring structure) such as, for example, the asymmetric diisocyanate trimers described in U.S. Pat. No. 5,717,091, which is incorporated by reference into this specification. In certain embodiments, the polyisocyanate comprises an asymmetric diisocyanate trimer based on hexamethylene diisocyanate (HDI), 1-isocyanato-3,3,5-trimethyl-5-isocyanatomethyl-cyclohexane (IPDI); or a combination thereof.

The coating compositions of the present invention may also comprise a polymeric polyol. As will be appreciated, the polymeric polyol is distinct from, and in addition to, any polymeric polyol that may be used to prepare an isocyanate group-containing prepolymer or semi-prepolymer described above with respect to the polyisocyanate. In certain embodiments, the polymeric polyol comprises acid, such as carboxylic acid, functional groups.

Polymeric polyols suitable for use in the compositions of various embodiments of the invention include polyester polyols, polyether polyols, and polycarbonate polyols, such as those described above with respect to the preparation of isocyanate group-containing prepolymers or semi-prepolymers.

In certain embodiments of the coating compositions of the present invention, the polymeric polyol comprises an acrylic polyol, including acrylic polyols that contain acid, such as carboxylic acid, functional groups. Acrylic polyols suitable for use in the coating compositions of the present invention include hydroxyl-containing copolymers of olefinically unsaturated compounds, such as those polymers that have a number average molecular weight (Me) determined by vapor pressure or membrane osmometry of 800 to 50,000, such as 1,000 to 20,000, or, in some cases, 5,000 to 10,000, and/or having a hydroxyl group content of 0.1 to 12% by weight, such as 1 to 10% by weight and, in some cases, 2 to 6% by weight and/or having an acid value of at least 0.1 mg KOH/g, such as at least 0.5 mg KOH/g and/or up to 10 mg KOH/g or, in some cases, up to 5 mg KOH/g.

Often, the copolymers are based on olefinic monomers containing hydroxyl groups and olefinic monomers which are free from hydroxyl groups. Examples of suitable olefinic monomers that are free of hydroxyl groups include vinyl and vinylidene monomers, such as styrene, α-methyl styrene, o- and p-chloro styrene, o-, m- and p-methyl styrene, p-tert-butyl styrene; acrylic acid; methacrylic acid; (meth)acrylonitrile; acrylic and methacrylic acid esters of alcohols containing 1 to 8 carbon atoms, such as ethyl acrylate, methyl acrylate, n- and iso-propyl acrylate, n-butyl acrylate, 2-ethylhexyl acrylate, 2-ethylhexyl methacrylate, iso-octyl acrylate, methyl methacrylate, ethyl methacrylate, butyl methacrylate and iso-octyl methacrylate; diesters of fumaric acid, itaconic acid or maleic acid having four to eight carbon atoms in the alcohol component; (meth)acrylic acid amide; and vinyl esters of alkane monocarboxylic acids having two to five carbon atoms, such as vinyl acetate or vinyl propionate.

Examples of suitable olefinic monomers containing hydroxyl groups are hydroxyalkyl esters of acrylic acid or methacrylic acid having two to four carbon atoms in the hydroxyalkyl group, such as 2-hydroxyethyl(meth)acrylate, 2-hydroxypropyl(meth)acrylate, 4-hydroxybutyl(meth)acrylate and trimethylolpropane-mono- or pentaerythritomono-(meth)acrylate. Mixtures of the monomers exemplified above may also be used for the preparation of the acrylic polyol. As will be appreciated, (meth)acrylate and (meth)acrylic is meant to encompass methacrylate and acrylate or methacrylic and acrylics, as the case may be. Mixtures of the various polymeric polyols described above may be used.

A long fiber based reinforcing material is necessary to provide mechanical strength to the pultruded composite used as a substrate in the invention, and to allow the transmission of the pulling force in the process. Fibers should preferably be at least long enough to pass though both the impregnation and curing dies and attach to a source of tension. In various embodiments of the invention, the fibrous reinforcing material is made of any fibrous material or materials that can provide long fibers capable of being at least partially wetted by the polyurethane formulation during impregnation. The fibrous reinforcing material may be single strands, braided strands, woven or non-woven mat structures and combinations thereof. Mats or veils made of long fibers may be used, in single ply or multi-ply structures.

Suitable fibrous materials are known in the pultrusion art, include, but are not limited to, glass fibers, glass mats, carbon fibers, polyester fibers, natural fibers, aramid fibers, nylon fibers, basalt fibers and combinations thereof. In some embodiments of the invention the fibrous reinforcing materials are long glass fibers. In various embodiments, the fibers and/or fibrous reinforcing structures may be formed continuously from one or more reels feeding into the pultrusion apparatus and attached to a source of pulling force at the outlet side of the curing die. In certain embodiments, the reinforcing fibers may optionally be pre-treated with sizing agents or adhesion promoters known to those skilled in the art.

The weight percentage of the long fiber reinforcement in the pultruded composites may vary considerably, depending on the end use application intended for the composite articles. In various embodiments of the invention, reinforcement loadings may be from 30% to 95% by weight, in some embodiments from 40% to 90% by weight of the final composite, in certain other embodiments from 60 to 90% by weight, and in various other embodiments from 70% to 90% by weight, based on the weight of the final composite. The long fiber reinforcement may be present in the pultruded composites in an amount ranging between any combination of these values, inclusive of the recited values.

In the polyurethane pultrusion composite, the polyisocyanate component and the isocyanate-reactive component may be the only components fed into the impregnation die in the pultrusion process. The polyisocyanate component or the isocyanate-reactive component may be premixed with any optional additives. However, it is to be understood that the optional additives that are not themselves polyfunctional isocyanate-reactive materials are to be considered (counted) as entities separate from the isocyanate-reactive component, even when mixed therewith. Likewise, if the optional additives, or any part thereof, are premixed with the polyisocyanate component, these are to be considered as entities separate from the polyisocyanate component, except in the case where they are themselves polyfunctional isocyanate species.

The impregnation die preferably provides for adequate mixing of the reactive components and adequate impregnation of the fibrous reinforcing material. The impregnation die may be fitted with a mixing apparatus, such as a static mixer, which provides for mixing of the reactive components before the resulting reaction mixture is used to impregnate the fibrous reinforcing structure. Other types of optional mixing devices known to those skilled in the art include, but are not limited to, high-pressure impingement mixing devices or low pressure dynamic mixers such as rotating paddles. In some embodiments, adequate mixing is provided in the impregnation die itself, without any additional mixing apparatus.

A pultrusion apparatus has at least one impregnation die and at least one curing die. Because no polymerization is to take place in the impregnation die, the curing die necessarily will operate at a higher temperature than the impregnation die. The pultrusion apparatus may optionally contain a plurality of curing dies, or zones. Different curing zones may be set at different temperatures, if desired, but all the zones of the curing die will be higher in temperature than the impregnation die. The pultrusion apparatus may optionally contain a plurality of impregnation dies. In certain embodiments, there is just one impregnation die, and this is situated immediately prior to the first curing die (or zone). As mentioned hereinabove, the impregnation die is set at a temperature that provides for substantially no reaction (polymerization) between the polyisocyanate component and the polyisocyanate-reactive component in the polyurethane-forming formulation before the fibrous reinforcing structure, which has been at least partially impregnated with the polyurethane-forming formulation, enters the first curing die (or zone).

The reaction mixture may optionally contain a catalyst for one or more of the polymer forming reactions of polyisocyanates. Catalyst(s), where used, is/are preferably introduced into the reaction mixture by pre-mixing with the isocyanate-reactive component. Catalysts for the polymer forming reactions of organic polyisocyanates are well known to those skilled in the art. Such catalysts include, but are not limited to, tertiary amines, tertiary amine acid salts, organic metal salts, covalently bound organometallic compounds, and combinations thereof. The levels of the preferred catalysts required to achieve the needed reactivity profile for pultrusion processing will vary with the composition of the formulation and must be optimized for each reaction system (formulation). Such optimization would be well understood by persons of ordinary skill in the art. The catalysts preferably have at least some degree of solubility in the isocyanate-reactive component used, and are most preferably fully soluble in that component at the use levels required.

Fluorosurfactants suitable for inclusion in the coating of the present invention include, perfluorooctanoic acid (PFOA), perfluorooctane sulfonate (PFOS), perfluorohexane sulfonic acid (PFHxS), perfluorononanoic acid (PFNA), perfluorodecanoic acid (PFDA). Fluorosurfactants are commercially available from a variety of suppliers such as DuPont (CAPSTONE), 3M (NOVEC) and others.

Silane adhesion promoters include, but are not limed to, 3-aminopropyltriethoxysilane, γ-mercaptopropyltrimethoxysilane, γ-glycidoxypropyltrimethoxysilane, 3-aminopropyltrimethoxysilane, and γ-isocyanatopropyltriethoxysilane. Such compounds are commercially available from Evonik (DYNASYLAN) and Momentive Performance Materials Inc. (SILQUEST) and others.

Silane-modified polyisocyanates are prepared by reacting a polyisocyanate with one of the organosilanes below

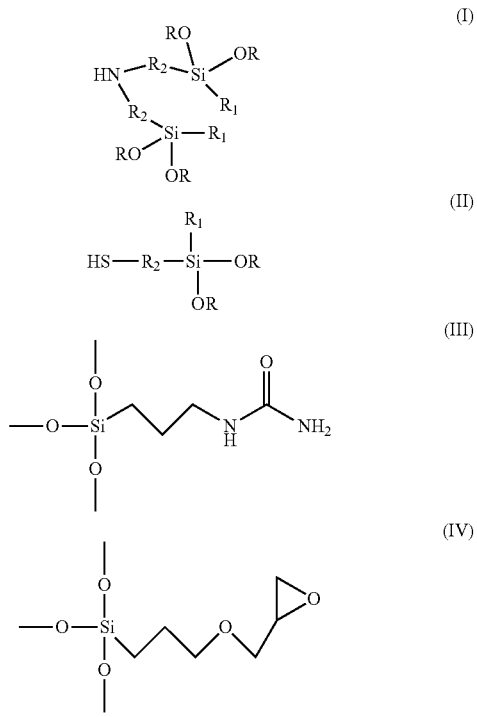

For compounds (I) and (II), R may be a linear or branched aliphatic group having from 2 to 50 carbon atoms, preferably from 6 to 30 carbon atoms. R can include carbon to carbon double or triple bonds, an aromatic ring, or other functional groups, so long as those groups are not reactive with the isocyanate. The hydrogen atoms in R can be partially or completely replaced with fluorine atoms.

Generic examples of specific organosilanes include, for instance ureido, amino, alkoxy, and mercapto silanes. Specific examples of organosilanes that may be used to prepare the silane-modified polyisocyanates include N, N'-bis ((3-triethoxysily) propyl) amine, N, N'-bis (3-tripropoxysily) propylamine, N-(3-trimethoxysilyl) propyl-3-(N-(3-trimethoxysilyl)-propylamino) propionamide, N (3-triethoxysilyl) propyl-3-(N-(3-triethoxysilyl)-propylamino) propionamide, N (3-trimethoxysilyl) propyl-3-(N-(3-triethoxysilyl)-propylamino) propionamide, and the like Preferably the organo silane is 3-mercaptopropyl-trimethoxysilane or 3-mercaptopropyl-triethoxysilane or N, N'-bis (3-trimethoxysilyl) propyl) amine or N, N' (bis (3-triethoxysilyl) propylamine, or ureidopropyltrimethoxysilane.

Other modifiers can be used in combination with the organosilanes to modify the polyisocyanates, for instance ureas (2 wt. % to 4 wt. %) and long chain fatty alcohols (2 wt. % to 4 wt. %), where the weight percent is based upon the weight of the polyisocyanate.

The mole ratio of silane groups of the organosilane to NCO groups of the polyisocyanate used to form the silane-modified polyisocyanate is from 0.03 to 2.2 mole %, preferably about 0.1 to 1.1 mole %. The free NCO content of the resulting product is typically greater than 30 percent, or close to the free NCO content of the starting polymeric isocyanate, which is around 32% to 33%.

The silane-modified polyisocyanates can be diluted with unmodified polyisocyanates including aliphatic, cycloaliphatic, aromatic, hybrid polyisocyanates, quasi-prepolymers, and prepolymers as mentioned before such as those used to prepare the modified polyisocyanates. The unmodified polyisocyanates have a free NCO content of 2% to 50%, preferably from 15% to 35%. The amount of the silane-modified polyisocyanate in the polyisocyanate component typically is from 1 wt. % to 100 wt. % based upon the total weight of the polyisocyanate in the polyisocyanate component, preferably from 2 wt. % to 16 wt. %.

The pultrusion formulation may contain other optional additives, if desired. Examples of additional optional additives include particulate or short fiber fillers, internal mold release agents, fire retardants, smoke suppressants, dyes, pigments, antistatic agents, antioxidants, UV stabilizers, minor amounts of viscosity reducing inert diluents, combinations of these, and any other known additives from the art. In some embodiments of the present invention, the additives or portions thereof may be provided to the fibers, such as by coating the fibers with the additive.

Internal mold release additives are highly preferred in pultrusion of mixing activated isocyanate-based resins systems to prevent sticking or buildup in the die. Suitable internal mold release agents may include, for example, fatty amides such as erucamide or stearamide, fatty acids such a oleic acid, oleic acid amides, fatty esters such as LOXIOL G71S inert polyester (Henkel), carnuba wax, beeswax (natural esters), butyl stearate, octyl stearate, ethylene glycol monostearate, ethylene glycol distearate, glycerin di-oleate, glycerin tri-oleate, and esters of polycarboxylic acids with long chain aliphatic monovalent alcohols such as dioctyl sebacate, mixtures of (a) mixed esters of aliphatic polyols, dicarboxylic acids and long-chained aliphatic monocarboxylic acids, and (b) esters of the groups: (1) esters of dicarboxylic acids and long-chained aliphatic monofunctional alcohols, (2) esters of long-chained aliphatic monofunctional alcohols and long-chained aliphatic monofunctional carboxylic acids, (3) complete or partial esters of aliphatic polyols and long-chained aliphatic monocarboxylic acids, silicones such as TEGO IMR 412T silicone (Goldschmidt), KEMESTER 5721 ester (a fatty acid ester product from Witco Corporation), fatty acid metal carboxylates such as zinc stearate and calcium stearate, waxes such as montan wax and chlorinated waxes, fluorine containing compounds such as polytetrafluoroethylene, fatty alkyl phosphates (both acidic and non acidic types such as ZELEC UN, ZELEC AN, ZELEC MR, ZELEC VM-, ZELEC UN, ZELECLA-1, and ZELEC LA-2 phosphates, (Stepan Chemical Company), chlorinated-alkyl phosphates; hydrocarbon oils, combinations of these, and the like. Especially preferred internal mold release agents are TECHLUBE 550HB (Technick Products) and 1948MCH (Axel Plastics).

Other preferred optional additives for use in pultrusion include moisture scavengers, such as molecular sieves; defoamers, such as polydimethylsiloxanes; coupling agents, such as the mono-oxirane or organo-amine functional trialkoxysilanes; combinations of these and the like. The coupling agents are particularly preferred for improving the bonding of the matrix resin to the fiber reinforcement. Fine particulate fillers, such as clays and fine silicas, may be used at thixotropic additives. Such particulate fillers may also serve as extenders to reduce resin usage. Fire retardants are sometimes desirable as additives in pultruded composites. Examples of preferred fire retardant types include, but are not limited to, triaryl phosphates; trialkyl phosphates, especially those bearing halogens; melamine (as filler); melamine resins (in minor amounts); halogenated paraffins and combinations thereof.

The stoichiometry of mixing isocyanate-based polymer forming formulations, containing an organic polyisocyanate and a polyfunctional isocyanate reactive resin is often expressed by a quantity known in the art as the isocyanate index. The index of such a mixing activated formulation is simply the ratio of the total number of reactive isocyanate (—NCO) groups present to the total number of isocyanate-reactive groups (that can react with the isocyanate under the conditions employed in the process). This quantity is often multiplied by 100 and expressed as a percent. Preferred isocyanate index values in the mixing activated formulations, which are suitable for use in the invention range from 70% to 150%. A more preferred range of index values is from 90% to 125%.

As those skilled in the art are aware, pultrusion of polyurethane and polyisocyanurate systems with fiber reinforced composites is performed by supplying the isocyanate and polyol components to a mix/metering machine for delivery in a desired ratio to a mixing apparatus, preferably a static mixer, to produce a reaction mixture. The reaction mixture is supplied to an injection die where it can be used to impregnate fibers being pulled concurrently into the injection die. The resulting uncured composite is pulled through a zoned heating die, attached directly to the injection die, having a desired cross-section where it is shaped and cured. The curing die has two to three heated zones equipped with electrical heating coils individually controlled to maintain the desired temperatures. The entrance to the die is cooled to prevent premature polymerization. The temperature at the hottest zone generally ranges from about 350° F. (177° C.) to about 450° F. (232° C.). The dynamic forces needed to pull the composite through the forming die are supplied by the pulling machine. This machine typically has gripping devices that contact the cured composite profile (or the glass fibers therein) and give the traction necessary to pull the composite profile through the die. The machine also has a device that develops a force in the desired direction of pull that gives the impetus necessary to pull the composite profile continuously through the die. The resulting composite profile upon exiting the pulling machine is then cut to the desired length typically by an abrasive cut off saw.

The polyurethane pultrusion composite may be coating with the inventive coating formulation under direct wet-on-hot and cold spray applications as are known to those skilled in the art.

EXAMPLES

The non-limiting and non-exhaustive examples that follow are intended to further describe various non-limiting and non-exhaustive embodiments without restricting the scope of the embodiments described in this specification. All quantities given in "weight" are understood to be normalized to 100 by weight, unless otherwise indicated.

The following materials were combined in the amounts given below in Table I to produce the four pultrusion topcoat compositions used in Examples 1-4.

| | |
|---|---|
| POLYOL A | a branched hydroxyl-bearing polyester (70% solids), commercially available from Covestro as DESMOPHEN 680; |
| POLYOL B | a slightly branched hydroxyl-bearing polyester (100% solids), commercially available from Covestro as DESMOPHEN 670A; |
| POLYOL C | a branched polyester polyol with 16.0% hydroxyl content (100% solids), commercially available from Covestro as DESMOPHEN XP 2488; |
| POLYOL D | a linear hydroxyl-bearing polyester, solvent-free liquid polyol (100% solids), commercially available from Covestro as DESMOPHEN 1652; |
| POLYOL E | a branched short-chain polyester polyol (100% solids), commercially available from Covestro as DESMOPHEN VP LS 2249/1; |
| ASPARTATE A | a polyaspartic acid ester prepared from bis-(4-aminocyclohexyl)-methane {amine-functional reactive resin, amine value 199-203 mg KOH/g, viscosity @ 25° C., 900-2000 mPa · s, commercially available from Covestro as DESMOPHEN NH 1420; |
| ADDITIVE A | a high molecular weight wetting and dispersing additive for solvent-borne systems and pigment concentrates, commercially available from BYK as DISPERBYK-163; |
| ADDITIVE B | a metallic diacrylate, commercially available from Sartomer Company, Inc. as PC300; |
| ADDITIVE D | a rutile titanium dioxide pigment manufactured by the chloride process. commercially available from DuPont as TI-PURE R-960; |
| ADDITIVE E | a hydrophobic fumed silica treated with a dimethyl silicone fluid commercially available from Cabot Corp. as CAB-O-SIL TS-720; |
| ADDITIVE F | fluorine based de-foamer, commercially available from Enterprise Specialty Products as FC 983; |
| ADDITIVE G | a fine ground limestone, commercially available from Specialty Minerals, Inc. as VICRON 15-15; |
| ADDITIVE H | a solvent soluble diol functional fluorinated (C4F9) polyether polymer, commercially available from Omnova Solutions Inc. as POLYFOX PF-7002; |
| ADDITIVE I | a solvent-free wetting and dispersing copolymer with acidic groups, commercially available from BYK as DISPERBYK-111; |
| ADDITIVE J | a silicone and polymer-containing defoamer/air release additive, commercially available from BYK as BYK-A 530; |
| ADDITIVE K | a surface additive on polyacrylate-basis for solvent-borne coating systems and printing inks, commercially available from BYK as BYK-358N; |
| ADDITIVE M | medium temperature reducer - a solvent blend for use in automotive refinish paint systems commercially available from PPG Industries as DT - 870; |
| ADDITIVE L | propylene carbonate |
| STABILIZER A | a hindered amine light stabilizer ("HALS"), commercially available from Ciba Specialty Chemicals as TINUVIN 292; |
| STABILIZER B | a hindered amine UV stabilizer, commercially available from Ciba Specialty Chemicals as TINUVIN 1130; |
| SURFACTANT A | a solution of a polyether modified polydimethylsiloxane, commercially available from BYK Chemie as BYK-306; |
| SURFACTANT B | a VOC-free and alkylphenol ethoxylate (APEO)-free, water-based dispersion, anionic fluorosurfactant, commercially available from DuPont as CAPSTONE FS-61; |
| SURFACTANT C | a fluorinated polymeric, water-based dispersion surfactant commercially available from DuPont as CAPSTONE FS-81; |
| CATALYST A | a dibutyltin dilaurate catalyst, commercially available from Air Products, as DABCO T-12; |
| CATALYST B | a low emissive, delayed action tertiary amine catalyst based on DBU, commercially available from Air Products as POLYCAT SA2LE; |
| SILANE A | a bifunctional silane possessing a reactive primary amino group and hydrolyzable ethoxysilyl groups (3-aminopropyltriethoxysilane), commercially available from Evonik as DYNASYLAN AMEO; |
| SILANE B | γ-mercaptopropyltrimethoxysilane, commercially available from Momentive Performance Materials Inc. as SILQUEST A-189; |
| SILANE C | γ-glycidoxypropyltrimethoxysilane commercially available from Momentive Performance Materials Inc. as SILQUEST A-187; |
| SILANE D | 3-aminopropyltrimethoxysilane, commercially available from Momentive Performance Materials Inc. as SILQUEST A-1100; |
| SILANE E | γ-isocyanatopropyltriethoxysilane commercially available from Momentive Performance Materials Inc. as SILQUEST A 1310; |
| ISOCYANATE A | a blocked, aliphatic polyisocyanate based on IPDI, having a blocked NCO content of approx. 8.1, commercially available from Covestro as DESMODUR BL 4265; |
| ISOCYANATE B | a blocked aliphatic polyisocyanate based on hexamethylene diisocyanate (HDI) having a blocked NCO content of approx. 11.1%, commercially available from Covestro as DESMODUR BL 3175A; |
| ISOCYANATE C | an aliphatic polyisocyanate resin based on hexamethylene diisocyanate, NCO content 23.5 ± 0.5%, viscosity 730 ± 100 mPa · s @ 23° C., commercially available from Covestro as DESMODUR N-3900; |
| ISOCYANATE D | a silane-functional aliphatic polyisocyanate based on hexamethylene diisocyanate NCO content of 15.9 wt. %, commercially available from Covestro as DESMODUR XP 2714; |
| ISOCYANATE E | a low-viscosity solvent-free aliphatic polyisocyanate (HDI uretdione) having an NCO group content of about 22.7 wt. % and a viscosity of about 90 mPa · s @ 23° C. commercially available from Covestro as DESMODUR XP 2730; |
| ISOCYANATE F | a hexamethylene diisocyanate (HDI)/isophorone diisocyanate (IPDI) trimer (NCO functionality >3) with 21.0% by weight NCO content commercially available from Covestro as DESMODUR XP 2489; |
| ISOCYANATE G | an aliphatic polyisocyanate (IPDI trimer) having an NCO content of 11.9 ± 0.4% and a viscosity of 600 ± 200 mPa · s @ 23° C., commercially available from Covestro as DESMODUR Z-4470 BA; |
| ISOCYANATE J | a polyfunctional aliphatic isocyanate resin based on hexamethylene diisocyanate (HDI) having an NCO content of 19.5 ± 0.5% and a viscosity of 450 ± 150 mPa · s @ 25° C., commercially available from Covestro as DESMODUR XP- 2580; |
| NMP | n-methyl-2-pyrrolidone. |

Examples 1-4

In each case, the coating was applied to a "soy-based" polyurethane pultrusion composite and a "standard" polyurethane pultrusion composite with a roller and allowed to cure for five minutes at 204.4° C. (400° F.) and allowed to rest for >15 hours before testing for adhesion. In an initial screening, none of the four coatings in Table I showed any adhesion on either the soy-based or standard composites.

The pultrusion substrates were Covestro PUL 2500 (standard) and PUL 3500 (soy based polyol) produced by a toll manufacturer. The substrates were tested by ASTM D-3359 cross hatch adhesion test method.

TABLE I

| Material | Ex. 1 Weight | Ex. 2 Weight | Ex. 3 Weight | Ex. 4 Weight |
|---|---|---|---|---|
| Component I | | | | |
| POLYOL A | 41.46 | 39.47 | 46.77 | 44.38 |
| ADDITIVE A | 0.96 | 0.91 | 1.11 | 1.05 |
| POLYOL B | 13.42 | 12.76 | 15.14 | 14.36 |
| STABILIZER A | 0.60 | 0.57 | 0.69 | 0.66 |
| STABILIZER B | 0.60 | 0.57 | 0.69 | 0.66 |
| SURFACTANT A | 1.90 | 1.81 | 2.22 | 2.11 |
| CATALYST A | 0.12 | 0.11 | 0.14 | 0.13 |
| SILANE A | 0.18 | 0.17 | 0.21 | 0.20 |
| SILANE B | 0.18 | 0.17 | 0.21 | 0.20 |
| NMP | | 4.76 | | 5.10 |
| Subtotal I | 59.42 | 61.3 | 67.18 | 68.85 |
| Component II | | | | |
| ISOCYANATE A | 40.59 | 38.67 | | |
| ISOCYANATE B | | | 32.82 | 31.15 |
| Subtotal II | 40.59 | 38.67 | 32.82 | 31.15 |
| Total Theoretical Results | 100.01 | 99.97 | 100 | 100 |
| Weight Solids | 68.48 | 65.22 | 72.18 | 68.50 |
| Volume Solids | 62.13 | 59.09 | 66.21 | 62.70 |
| P/B | 0 | 0 | 0 | 0 |
| PVC | 0 | 0 | 0 | 0 |
| Wt/Gal | 8.82 | 8.81 | 8.93 | 8.92 |
| Mix Ratio (vol.) | 1.40:1 | 1.52:1 | 2.02:1 | 2.19:1 |
| NCO:OH | 1.00 | 1.00 | 1.00 | 1.00 |
| Theoretical VOC | 2.78 | 3.06 | 2.49 | 2.81 |
| Adhesion | Fail | Fail | Fail | Fail |

Examples 5-38

TABLE II

| Material | Ex. 5 Weight | Ex. 6 Weight | Ex. 7 Weight | Ex. 8 Weight | Ex. 9 Weight | Ex. 10 Weight | Ex. 11 Weight | Ex. 11 Weight | Ex. 11 Weight |
|---|---|---|---|---|---|---|---|---|---|
| Component I | | | | | | | | | |
| POLYOL C | 37.23 | 35.28 | 35.03 | 33.08 | 31.33 | 28.34 | 33.28 | 34.68 | 34.68 |
| NMP | | | | | | | 5.00 | | |
| SILANE C | | | | | | | | 0.99 | |
| SILANE D | | | | | | | | | 0.99 |
| Subtotal I | 37.23 | 35.28 | 35.03 | 33.08 | 31.33 | 28.34 | 38.28 | 35.67 | 35.67 |
| Component II | | | | | | | | | |
| ISOCYANATE C | 62.77 | 48.54 | 64.97 | 66.92 | 68.67 | 71.66 | 61.72 | 64.33 | 64.33 |
| ISOCYANATE D | | 16.18 | | | | | | | |
| Subtotal II | 62.77 | 64.72 | 64.97 | 16.73 | 17.17 | 17.92 | 15.43 | 16.08 | 16.08 |
| Total Theoretical | 100 | 100 | 100 | 100 | 100 | 100 | 100 | 100 | 100 |
| Weight Solids | 100.00 | 100.00 | 100.00 | 100.00 | 100.00 | 100.00 | 95.00 | 100.00 | 100.00 |
| Volume Solids | 100.00 | 100.00 | 100.00 | 100.00 | 100.00 | 100.00 | 94.49 | 100.00 | 100.00 |
| P/B | 0 | 0 | 0 | 0 | 0 | 0 | 0 | 0 | 0 |
| PVC | 0 | 0 | 0 | 0 | 0 | 0 | 0 | 0 | 0 |
| Wt/Gal | 9.51 | 9.50 | 9.51 | 9.52 | 9.52 | 9.53 | 9.46 | 9.50 | 9.49 |
| Mix Ratio (vol.) | 0.61:1 | 0.56:1 | 0.55:1 | 0.51:1 | 0.47:1 | 0.41:1 | 0.64:1 | 0.57:1 | 0.57:1 |
| NCO:OH | 1.00 | 1.00 | 1.10 | 1.20 | 1.30 | 1.50 | 1.10 | 1.10 | 1.10 |
| Theoretical VOC | 0 | 0 | 0 | 0 | 0 | 0 | 0.47 | 0 | 0 |
| Adhesion | Fail | Fail | Fail | Fail | Fail | Fail | Fail | Fail | Fail |

TABLE III

| Material | Ex. 12 Weight | Ex. 13 Weight | Ex. 14 Weight | Ex. 15 Weight | Ex. 16 Weight | Ex. 17 Weight | Ex. 18 Weight | Ex. 19 Weight | Ex. 20 Weight |
|---|---|---|---|---|---|---|---|---|---|
| Component I | | | | | | | | | |
| POLYOL C | 34.68 | 32.7 | 34 | | 5.5 | 5.46 | | | 33.87 |
| ASPARTATE A | | | | 58.67 | 49.47 | 49.14 | 55.88 | 53.22 | |
| NMP | | | | | | | | 4.76 | |
| ADDITIVE B | | | | | | | | 4.53 | |
| SILANE A | | | | | | | | | 0.26 |
| SILANE B | | | | | | | | | 0.26 |

TABLE III-continued

| Material | Ex. 12 Weight | Ex. 13 Weight | Ex. 14 Weight | Ex. 15 Weight | Ex. 16 Weight | Ex. 17 Weight | Ex. 18 Weight | Ex. 19 Weight | Ex. 20 Weight |
|---|---|---|---|---|---|---|---|---|---|
| SILANE E | 0.99 | | | | | | | | |
| SURFACTANT A | | | | | | | | | 2.78 |
| SURFACTANT B | | 6.67 | | | | | | | |
| SURFACTANT C | | | 2.94 | | | | | | |
| WATER | | | | | | 0.05 | | | |
| Subtotal I | 35.67 | 39.37 | 36.94 | 58.67 | 54.97 | 54.65 | 55.88 | 62.51 | 37.08 |
| Component II | | | | | | | | | |
| ISOCYANATE C | 64.33 | 60.64 | 63.06 | 41.33 | 45.04 | 45.34 | 39.36 | 37.49 | 62.82 |
| Subtotal II | 64.33 | 60.64 | 63.06 | 41.33 | 45.04 | 45.34 | 39.36 | 37.49 | 62.82 |
| Total Theoretical | 100 | 100.01 | 100 | 100 | 100.01 | 99.99 | 95.24 | 100 | 99.99 |
| Weight Solids | 100 | 94.27 | 98.03 | 100 | 100 | 100 | 100 | 95.24 | 97.56 |
| Volume Solids | 100 | 93.49 | 97.76 | 100.21 | 100.18 | 100.17 | 100.2 | 95.06 | 96.96 |
| P/B | 0 | 0 | 0 | 0 | 0 | 0 | 0 | 0 | 0 |
| PVC | 0 | 0 | 0 | 0 | 0 | 0 | 0 | 0 | 0 |
| Wt/Gal | 9.5 | 9.49 | 9.49 | 9.13 | 9.19 | 9.19 | 9.29 | 9.25 | 9.44 |
| Mix Ratio (vol.) | 0.57:1 | 0.67:1 | 0.60:1 | 1.54:1 | 1.32:1 | 1.30:1 | 1.63:1 | 1.77:1 | 0.62:1 |
| NCO:OH | 1.1 | 1.1 | 1.1 | 1.1 | 1.1 | 1.1 | 1.1 | 1.1 | 1.1 |
| Theoretical VOC | 0 | 0 | 0 | 0 | 0 | 0 | 0 | 0.44 | 0.23 |
| Adhesion | Fail | Pass | Pass | Fail | Fail | Fail | Fail | Fail | Pass |

TABLE IV

| Material | Ex. 21 Weight | Ex. 22 Weight | Ex. 23 Weight | Ex. 24 Weight | Ex. 25 Weight | Ex. 26 Weight | Ex. 27 Weight | Ex. 28 Weight | Ex. 29 Weight |
|---|---|---|---|---|---|---|---|---|---|
| Component I | | | | | | | | | |
| POLYOL C | 33.55 | 33.23 | 28.38 | | 34.29 | 33.96 | 36.19 | 30.16 | 35.84 |
| ASPARTATE A | | | | 57.03 | | | | | |
| SILANE A | 0.26 | 0.26 | | | | | | | |
| SILANE B | 0.26 | 0.26 | | | | | | | |
| SURFACTANT A | 2.76 | 2.73 | | 2.8 | 2.8 | 2.77 | 2.8 | 2.77 | 2.77 |
| SURFACTANT C | | | 2.46 | | | | | | |
| ADDITIVE D | | | 16.2 | | | | | | |
| ADDITIVE I | | | 0.32 | | | | | | |
| CATALYST B | 0.96 | 1.9 | | | | 0.96 | | 0.96 | 0.96 |
| Subtotal I | 37.79 | 38.38 | 47.36 | 59.83 | 37.09 | 37.69 | 38.99 | 33.89 | 39.57 |
| Component II | | | | | | | | | |
| ISOCYANATE C | 62.22 | 61.63 | 52.64 | 40.17 | 47.18 | 46.73 | 61.01 | 66.11 | 60.43 |
| ISOCYANATE D | | | | | 15.73 | 15.58 | | | |
| Subtotal II | 62.22 | 61.63 | 52.64 | 40.17 | 62.91 | 62.31 | 61.01 | 66.11 | 60.43 |
| Total Theoretical | 100.01 | 100.01 | 100 | 100 | 100 | 100 | 100 | 100 | 100 |
| Weight Solids | 97.59 | 97.61 | 98.36 | 97.55 | 97.55 | 97.57 | 97.55 | 97.57 | 97.57 |
| Volume Solids | 96.99 | 97.02 | 97.89 | 97.26 | 96.95 | 96.98 | 96.95 | 96.97 | 96.97 |
| P/B | 0 | 0 | 0.2 | 0 | 0 | 0 | 0 | 0 | 0 |
| PVC | 0 | 0 | 5.52 | 0 | 0 | 0 | 0 | 0 | 0 |
| Wt/Gal | 9.44 | 9.44 | 10.73 | 9.09 | 9.43 | 9.44 | 9.44 | 9.46 | 9.44 |
| Mix Ratio (vol.) | 0.63:1 | 0.65:1 | 0.70:1 | 1.63:1 | 0.61:1 | 0.63:1 | 0.67:1 | 0.54:1 | 0.68:1 |
| NCO:OH | 1.1 | 1.1 | 1.1 | 1.1 | 1 | 1 | 1 | 1.3 | 1 |
| Theoretical VOC | 0.23 | 0.23 | 0 | 0.22 | 0.23 | 0.23 | 0.23 | 0.23 | 0.23 |
| Adhesion | Pass | Pass | Fail | Fail | Pass | Pass | Pass | Fail | Pass |

TABLE V

| Material | Ex. 30 Weight | Ex. 31 Weight | Ex. 32 Weight | Ex. 33 Weight | Ex. 34 Weight | Ex. 35 Weight | Ex. 36 Weight | Ex. 37 Weight | Ex. 38 Weight |
|---|---|---|---|---|---|---|---|---|---|
| Component I | | | | | | | | | |
| POLYOL C | 34.51 | 28.64 | 23.43 | 23.63 | 23.35 | 21.79 | 11.39 | 11.98 | 11.64 |
| POLYOL D | | | | | | | 11.39 | 11.98 | 11.64 |
| SILANE A | | | 0.17 | | | | 0.26 | | |
| SILANE B | | | 0.17 | | | | 0.26 | | |
| SURFACTANT A | | | 1.82 | | 1.82 | 1.82 | 4.22 | | |
| SURFACTANT C | | | | 0.97 | | | | 2 | 3.27 |
| ADDITIVE D | | | 12.66 | 12.77 | 12.62 | 12.66 | 10.56 | 11.16 | 10.78 |
| ADDITIVE E | | | 0.63 | 0.64 | 0.63 | 0.63 | 0.53 | 0.56 | 0.54 |
| ADDITIVE F | 0.49 | | | | | | | | |
| ADDITIVE G | | | 19 | 19.16 | 18.93 | 18.99 | 15.84 | 16.74 | 16.17 |
| ADDITIVE I | | | 1.93 | 1.95 | 1.93 | 1.94 | 1.62 | 1.71 | 1.65 |
| CATALYST B | 0.99 | | 0.63 | 0.64 | 0.63 | 0.63 | 1.06 | 1.12 | 0.54 |
| Subtotal I | 35.99 | 28.64 | 60.44 | 59.76 | 59.91 | 58.46 | 57.13 | 57.25 | 56.23 |
| Component II | | | | | | | | | |
| ISOCYANATE C | 64.01 | | 39.89 | 40.24 | 39.75 | | | | |
| ISOCYANATE D | | 71.36 | | | | | | 6.37 | |
| ISOCYANATE F | | | | | | 41.52 | | | |
| ISOCYANATE G | | | | | | | 42.86 | 36.4 | 43.77 |
| Subtotal II | 64.01 | 71.36 | 39.89 | 40.24 | 39.75 | 41.52 | 42.86 | 42.77 | 43.77 |
| Total Theoretical | 100 | 100 | 100.33 | 100 | 99.66 | 99.98 | 99.99 | 100.02 | 100 |
| Weight Solids | 100 | 100 | 97.5 | 99.07 | 97.51 | 97.47 | 83.45 | 87.74 | 84.68 |
| Volume Solids | 100 | 100 | 97.5 | 99.07 | 97.51 | 97.47 | 75.77 | 81.66 | 77.52 |
| P/B | 0 | 0 | 0.51 | 0.51 | 0.51 | 0.51 | 0.51 | 0.51 | 0.51 |
| PVC | 0 | 0 | 16.02 | 16.02 | 16.02 | 16.21 | 16.08 | 16.08 | 16.08 |
| Wt/Gal | 9.5 | 9.46 | 11.86 | 11.94 | 11.84 | 11.99 | 10.84 | 11.15 | 10.98 |
| Mix Ratio (vol.) | 0.58:1 | 0.41:1 | 1.03:1 | 1.00:1 | 1.04:1 | 0.97:1 | 0.89:1 | 0.86:1 | 0.82:1 |
| NCO:OH | 1.1 | 1 | 1.01 | 1.01 | 1.01 | 1.01 | 1.01 | 1.01 | 1.01 |
| Theoretical VOC | 0 | 0 | 0.19 | 0 | 0.19 | 0.19 | 1.79 | 1.24 | 1.48 |
| Adhesion | Pass | Fail | Fail | Fail | Fail | Pass | Pass | Pass | Pass |

TABLE VI

| Material | Ex. 39 Weight | Ex. 40 Weight | Ex. 41 Weight | Ex. 42 Weight | Ex. 43 Weight | Ex. 44 Weight | Ex. 45 Weight | Ex. 46 Weight | Ex. 47 Weight |
|---|---|---|---|---|---|---|---|---|---|
| Component I | | | | | | | | | |
| POLYOL C | 21.83 | 16.06 | 16.23 | 31.42 | 30.56 | | 30.99 | | |
| POLYOL E | | | | | | 31.32 | | 31.76 | 32.36 |
| SURFACTANT C | 1 | 1 | | | | | | | |
| ADDITIVE D | 12.69 | 10.98 | 11.09 | | | | | | |
| ADDITIVE E | 0.63 | 0.55 | 0.55 | 0.94 | 0.92 | 0.92 | 0.93 | 0.93 | 0.95 |
| ADDITIVE G | 19.03 | 16.47 | 16.64 | | | | | | |
| ADDITIVE I | 1.94 | 1.68 | 1.7 | | | | | | |
| ADDITIVE J | | | | | 1.84 | 1.84 | 1.86 | 1.86 | |
| ADDITIVE K | | | | | 0.88 | 0.88 | 0.89 | 0.89 | 0.91 |
| STABILIZER A | | | | 0.94 | 0.92 | 0.92 | 0.93 | 0.93 | 0.95 |
| STABILIZER B | | | | 1.89 | 1.84 | 1.84 | 1.86 | 1.86 | 1.9 |
| CATALYST B | 1.27 | 1.1 | 1.11 | 1.89 | 1.84 | 1.84 | 0.47 | 0.47 | 0.47 |
| Subtotal I | 58.39 | 47.84 | 47.32 | 37.08 | 38.8 | 39.56 | 37.93 | 38.7 | 37.54 |
| Component II | | | | | | | | | |
| ISOCYANATE D | | 7.77 | 7.85 | 12.58 | 12.24 | 12.09 | 12.41 | 12.26 | 12.49 |
| ISOCYANATE F | 41.6 | | | 50.34 | 48.97 | 48.36 | 49.65 | 49.04 | 49.97 |
| ISOCYANATE G | | 44.39 | 44.84 | | | | | | |
| Subtotal II | 41.6 | 52.16 | 52.69 | 62.92 | 61.21 | 60.45 | 62.06 | 61.3 | 62.46 |
| Total Theoretical | 99.99 | 100 | 100.01 | 100 | 100.01 | 100.01 | 99.99 | 100 | 100 |
| Weight Solids | 99.33 | 86.01 | 86.55 | 100 | 97.83 | 97.83 | 97.8 | 97.8 | 99.56 |
| Volume Solids | 99.03 | 79.24 | 79.87 | 100 | 96.87 | 96.94 | 96.83 | 96.9 | 99.44 |
| P/B | 0.51 | 0.51 | 0.51 | 0.01 | 0.01 | 0.01 | 0.01 | 0.01 | 0.01 |

TABLE VI-continued

| Material | Ex. 39 Weight | Ex. 40 Weight | Ex. 41 Weight | Ex. 42 Weight | Ex. 43 Weight | Ex. 44 Weight | Ex. 45 Weight | Ex. 46 Weight | Ex. 47 Weight |
|---|---|---|---|---|---|---|---|---|---|
| PVC | 16.21 | 15.99 | 15.99 | 0.64 | 0.64 | 0.62 | 0.64 | 0.62 | 0.62 |
| Wt/Gal | 12.05 | 10.98 | 11.01 | 9.63 | 9.53 | 9.33 | 9.53 | 9.33 | 9.4 |
| Mix Ratio (vol.) | 0.95:1 | 0.55:1 | 0.53:1 | 0.61:1 | 0.67:1 | 0.73:1 | 0.65:1 | 0.70:1 | 0.66:1 |
| NCO:OH | 1.01 | 1.01 | 1.01 | 1.01 | 1.01 | 1.01 | 1.01 | 1.01 | 1.01 |
| Theoretical VOC | 0 | 1.48 | 1.48 | 0 | 0.21 | 0.2 | 0.21 | 0.2 | 0.04 |
| Adhesion | Pass | Pass | Pass | Pass | Pass | Pass | Pass | Pass | Pass |

TABLE VII

| Material | Ex. 48 Weight | Ex. 49 Weight | Ex. 50 Weight | Ex. 51 Weight | Ex. 52 Weight |
|---|---|---|---|---|---|
| Component I | | | | | |
| POLYOL E | 31.74 | 32.63 | 21.21 | 21.03 | 21.03 |
| SILANE A | | | | | |
| SURFACTANT C | 2.82 | | | 1.87 | 1.87 |
| ADDITIVE E | 0.93 | 0.96 | 0.62 | 0.62 | 0.62 |
| ADDITIVE H | | 0.1 | 0.06 | | |
| ADDITIVE M | | | 34.3 | 25.31 | 33.07 |
| ADDITIVE L | | | 0.7 | 8.44 | 0.67 |
| STABILIZER A | 0.93 | 0.96 | 0.62 | 0.62 | 0.62 |
| STABILIZER B | 1.86 | 1.91 | 1.24 | 1.23 | 1.23 |
| CATALYST B | 0.46 | 0.48 | 0.31 | 0.31 | 0.31 |
| Subtotal I | 38.74 | 37.04 | 59.06 | 59.43 | 59.42 |
| Component II | | | | | |
| ISOCYANATE D | 12.25 | 12.59 | 8.19 | 8.12 | 8.12 |
| ISOCYANATE F | 49.01 | 50.38 | 32.75 | 32.47 | 32.47 |
| ISOCYANATE J | | | | | |
| Subtotal II | 61.26 | 62.97 | 40.94 | 40.59 | 40.59 |
| Total Theoretical | 100 | 100.01 | 100 | 100.02 | 100.01 |
| Weight Solids | 98.11 | 100 | 65 | 65 | 65 |
| Volume Solids | 97.87 | 100 | 58.15 | 59.91 | 58.26 |
| P/B | 0.01 | 0.01 | 0.01 | 0.01 | 0.01 |
| PVC | 0.62 | 0.62 | 0.62 | 0.62 | 0.62 |
| Wt/Gal | 9.4 | 9.41 | 8.42 | 8.68 | 8.44 |
| Mix Ratio (vol.) | 0.69:1 | 0.64:1 | 1.83:1 | 1.76:1 | 1.84:1 |
| NCO:OH | 1.01 | 1.01 | 1.01 | 1.01 | 1.01 |
| Theoretical VOC | 0 | 0 | 2.91 | 2.41 | 2.85 |
| Adhesion | Pass | Pass | Pass | Pass | Pass |

TABLE VIII

| Material | Ex. 53 Weight | Ex. 54 Weight | Ex. 55 Weight | Ex. 56 Weight | Ex. 57 Weight |
|---|---|---|---|---|---|
| Component I | | | | | |
| POLYOL E | 21.41 | 21.3 | 21.11 | 20.72 | 21.51 |
| SILANE A | 0.31 | 0.61 | 1.21 | 2.37 | |
| SURFACTANT C | 1.86 | 1.85 | 1.83 | 1.80 | 1.87 |
| ADDITIVE E | 0.61 | 0.61 | 0.6 | 0.59 | 0.62 |
| ADDITIVE H | | | | | |
| ADDITIVE M | 33.08 | 33.09 | 33.1 | 33.12 | 33.07 |
| ADDITIVE L | 0.68 | 0.68 | 0.68 | 0.68 | 0.67 |
| STABILIZER A | 0.61 | 0.61 | 0.6 | 0.59 | 0.62 |
| STABILIZER B | 1.23 | 1.22 | 1.21 | 1.19 | 1.23 |
| CATALYST B | 0.31 | 0.31 | 0.3 | 0.3 | 0.31 |
| Subtotal I | 60.1 | 60.28 | 60.64 | 61.36 | 59.99 |
| Component II | | | | | |
| ISOCYANATE D | | | | | |
| ISOCYANATE F | 31.93 | 31.78 | 31.49 | 30.91 | 32.08 |
| ISOCYANATE J | 7.98 | 7.95 | 7.87 | 7.73 | 8.02 |
| Subtotal II | 39.91 | 39.73 | 39.36 | 38.64 | 40.1 |
| Total Theoretical | 100.01 | 100.01 | 100 | 100 | 100 |
| Weight Solids | 65 | 65 | 65 | 65 | 65.00 |
| Volume Solids | 58.37 | 58.39 | 58.43 | 58.5 | 58.35 |
| P/B | 0.01 | 0.01 | 0.01 | 0.01 | 0.01 |
| PVC | 0.62 | 0.62 | 0.62 | 0.62 | 0.62 |
| Wt/Gal | 8.42 | 8.42 | 8.41 | 8.39 | 8.43 |
| Mix Ratio (vol.) | 1.88:1 | 1.90:1 | 1.93:1 | 1.99:1 | 1.87:1 |
| NCO:OH | 1.01 | 1.01 | 1.01 | 1.01 | 1.01 |
| Theoretical VOC | 2.84 | 2.84 | 2.83 | 2.83 | 2.84 |
| Adhesion | Pass | Pass | Pass | Pass | Pass |

This specification has been written with reference to various non-limiting and non-exhaustive embodiments. However, it will be recognized by persons having ordinary skill in the art that various substitutions, modifications, or combinations of any of the disclosed embodiments (or portions thereof) may be made within the scope of this specification. Thus, it is contemplated and understood that this specification supports additional embodiments not expressly set forth herein. Such embodiments may be obtained, for example, by combining, modifying, or reorganizing any of the disclosed steps, components, elements, features, aspects, characteristics, limitations, and the like, of the various non-limiting embodiments described in this specification. In this manner, Applicant reserves the right to amend the claims during prosecution to add features as variously described in this specification, and such amendments comply with the requirements of 35 U.S.C. § 112(a), and 35 U.S.C. § 132(a).

Various aspects of the subject matter described herein are set out in the following numbered clauses:

1. A polyurethane coating composition comprising a fluorosurfactant, a silane adhesion promoter, and a silane modified polyisocyanate, wherein the composition has excellent substrate wet-out and adhesion under direct wet-on-hot and cold spray applications.

2. The polyurethane coating composition according to clause 1, wherein the fluorosurfactant is selected from the group consisting of perfluorooctanoic acid (PFOA), perfluorooctane sulfonate (PFOS), perfluorohexane sulfonic acid (PFHxS), perfluorononanoic acid (PFNA), and perfluorodecanoic acid (PFDA).

3. The polyurethane coating composition according to one of clauses 1 and 2, wherein the silane adhesion promoter is selected from the group consisting of 3-aminopropyltriethoxysilane, γ-mercaptopropyltrimethoxysilane, γ-glycidoxypropyltrimethoxysilane, 3-aminopropyltrimethoxysilane, and γ-isocyanatopropyltriethoxysilane.

4. The polyurethane coating composition according to one of clauses 1 to 3, wherein the silane modified polyisocyanate is the reaction product of an isocyanate functional urethane prepolymer and an organosilane.

5. The polyurethane coating composition according to clause 4, wherein the isocyanate is selected from the group consisting of hexamethylene diisocyanate ("HDI"), 1-isocyanato-3,3,5-trimethyl-5-isocyanatomethyl-cyclohexane ("IPDI") homopolymers and combinations thereof.

6. The polyurethane coating composition according to clause 4, wherein the organosilane is selected from the group consisting N, N'-bis (3-triethoxysily) propyl) amine, N, N'-bis (3-tripropoxysily) propylamine, N-(3-trimethoxysilyl) propyl-3-(N-(3-trimethoxysilyl)-propylamino) propionamide, N (3-triethoxysilyl) propyl-3-(N-(3-triethoxysilyl)-propylamino) propionamide, N (3-trimethoxysilyl) propyl-3-(N-(3-triethoxysilyl)-propylamino) propionamide, 3-mercaptopropyl-trimethoxysilane, 3-mercaptopropyl-triethoxysilane, N, N'-bis (3-trimethoxysilyl) propyl) amine, N, N' (bis (3-triethoxysilyl) propylamine, and ureidopropyltrimethoxysilane.

7. The polyurethane coating composition according to clause 4, wherein the prepolymer includes a high solids polyester polyol.

8. A method of making a polyurethane coating composition comprising reacting a fluorosurfactant, a silane adhesion promoter, and a silane modified polyisocyanate.

9. The method according to clause 8, wherein the fluorosurfactant is selected from the group consisting of perfluorooctanoic acid (PFOA), perfluorooctane sulfonate (PFOS), perfluorohexane sulfonic acid (PFHxS), perfluorononanoic acid (PFNA), and perfluorodecanoic acid (PFDA).

10. The method according to one of clauses 8 and 9, wherein the silane adhesion promoter is selected from the group consisting of 3-aminopropyltriethoxysilane, γ-mercaptopropyltrimethoxysilane, γ-glycidoxypropyltrimethoxysilane, 3-aminopropyltrimethoxysilane, and γ-isocyanatopropyltriethoxysilane.

11. The method according to one of clauses 8 to 10, wherein the silane modified polyisocyanate is the reaction product of an isocyanate functional urethane prepolymer and an organosilane.

12. The method according to clause 11, wherein the isocyanate is selected from the group consisting of hexamethylene diisocyanate ("HDI"), 1-isocyanato-3,3,5-trimethyl-5-isocyanatomethyl-cyclohexane ("IPDI") homopolymers and combinations thereof.

13. The method according to clause 11, wherein the organosilane is selected from the group consisting N, N'-bis ((3-triethoxysily) propyl) amine, N, N'-bis (3-tripropoxysily) propylamine, N-(3-trimethoxysilyl) propyl-3-(N-(3-trimethoxysilyl)-propylamino) propionamide, N (3-triethoxysilyl) propyl-3-(N-(3-triethoxysilyl)-propylamino) propionamide, N (3-trimethoxysilyl) propyl-3-(N-(3-triethoxysilyl)-propylamino) propionamide, 3-mercaptopropyl-trimethoxysilane, 3-mercaptopropyl-triethoxysilane, N, N'-bis (3-trimethoxysilyl) propyl) amine, N, N' (bis (3-triethoxysilyl) propylamine, and ureidopropyltrimethoxysilane.

14. The method according to clause 11, wherein the prepolymer includes a high solids polyester polyol.

15. A substrate coated with a polyurethane coating composition comprising a fluorosurfactant, a silane adhesion promoter, and a silane modified polyisocyanate, wherein the composition has excellent substrate wet-out and adhesion under direct wet-on-hot and cold spray applications.

16. The substrate according to clause 15, wherein the fluorosurfactant is selected from the group consisting of perfluorooctanoic acid (PFOA), perfluorooctane sulfonate (PFOS), perfluorohexane sulfonic acid (PFHxS), perfluorononanoic acid (PFNA), and perfluorodecanoic acid (PFDA).

17. The substrate according to one of clauses 15 and 16, wherein the silane adhesion promoter is selected from the group consisting of 3-aminopropyltriethoxysilane, γ-mercaptopropyltrimethoxysilane, γ-glycidoxypropyltrimethoxysilane, 3-aminopropyltrimethoxysilane, and γ-isocyanatopropyltriethoxysilane.

18. The substrate according to one of clauses 15 to 17, wherein the silane modified polyisocyanate is the reaction product of an isocyanate functional urethane prepolymer and an organosilane.

19. The substrate according to clause 18, wherein the isocyanate is selected from the group consisting of hexamethylene diisocyanate ("HDI"), 1-isocyanato-3,3,5-trimethyl-5-isocyanatomethyl-cyclohexane ("IPDI") homopolymers and combinations thereof.

20. The substrate according to clause 18, wherein the organosilane is selected from the group consisting N, N'-bis ((3-triethoxysily) propyl) amine, N, N'-bis(3-tripropoxysily) propylamine, N-(3-trimethoxysilyl)propyl-3-(N-(3-trimethoxysilyl)-propylamino)propionamide, N-(3-triethoxysilyl)propyl-3-(N-(3-triethoxysilyl)-propylamino)propionamide, N-(3-trimethoxysilyl) propyl-3-(N-(3-triethoxysilyl)-propylamino)-propionamide, 3-mercaptopropyl-trimethoxysilane, 3-mercaptopropyl-triethoxysilane, N,N'-bis(3-trimethoxysilyl)propyl)amine, N,N'-(bis(3-triethoxysilyl)propylamine, and ureidopropyltrimethoxysilane.

21. The substrate according to clause 18, wherein the prepolymer includes a high solids polyester polyol.

22. The substrate according to one of clauses 15 to 21, wherein the substrate comprises a polyurethane pultrusion composite.

23. A polyurethane pultrusion composite coated with a polyurethane coating composition comprising a fluorosurfactant, a silane adhesion promoter, and a silane modified polyisocyanate, wherein the composition has excellent substrate wet-out and adhesion under direct wet-on-hot and cold spray applications.

24. The polyurethane pultrusion composite according to clause 23, wherein the fluorosurfactant is selected from the group consisting of perfluorooctanoic acid (PFOA), perfluorooctane sulfonate (PFOS), perfluorohexane sulfonic acid (PFHxS), perfluorononanoic acid (PFNA), and perfluorodecanoic acid (PFDA).

25. The polyurethane pultrusion composite according to one of clauses 23 and 24, wherein the silane adhesion promoter is selected from the group consisting of 3-aminopropyltriethoxysilane, γ-mercaptopropyl-trimethoxysilane, γ-glycidoxypropyltrimethoxysilane, 3-aminopropyltrimethoxysilane, and γ-isocyanatopropyltriethoxysilane.

26. The polyurethane pultrusion composite according to one of clauses 23 to 25, wherein the silane modified polyisocyanate is the reaction product of an isocyanate functional urethane prepolymer and an organosilane.

27. The polyurethane pultrusion composite according to clause 26, wherein the isocyanate is selected from the group consisting of hexamethylene diisocyanate ("HDI"), 1-isocyanato-3,3,5-trimethyl-5-isocyanatomethyl-cyclohexane ("IPDI") homopolymers and combinations thereof.

28. The polyurethane pultrusion composite according to clause 26, wherein the organosilane is selected from the group consisting N,N'-bis ((3-triethoxysily)propyl)amine, N,N'-bis(3-tripropoxysily)propylamine, N-(3-trimethoxysilyl)propyl-3-(N-(3-trimethoxysilyl)-propylamino)propionamide, N-(3-triethoxysilyl)propyl-3-(N-(3-triethoxysilyl)-propylamino)propionamide, N-(3-trimethoxysilyl)propyl-3-(N-(3-triethoxysilyl)-propylamino) propionamide, 3-mercaptopropyl-trimethoxysilane, 3-mercaptopropyl-triethoxysilane, N, N'-bis(3-trimethoxysilyl)propyl)amine, N,N'-(bis(3-triethoxysilyl)propylamine, and ureidopropyltrimethoxysilane.

29. The polyurethane pultrusion composite according to clause 26, wherein the prepolymer includes a high solids polyester polyol.

What is claimed is:

1. A polyurethane pultrusion composite coated with a polyurethane coating composition comprising:
a fluorosurfactant, a silane adhesion promoter, and a silane modified polyisocyanate, wherein the fluorosurfactant is selected from the group consisting of perfluorooctanoic acid (PFOA), perfluorooctane sulfonate (PFOS), perfluorohexane sulfonic acid (PFHxS), perfluorononanoic acid (PFNA), or perfluorodecanoic acid (PFDA) and wherein the composition has excellent substrate wet-out and adhesion under direct wet-on-hot and cold spray applications.

2. The polyurethane pultrusion composite according to claim 1, wherein the silane adhesion promoter is selected from the group consisting of 3-aminopropyltriethoxysilane, γ-mercaptopropyltrimethoxysilane, γ-glycidoxypropyltrimethoxysilane, 3-aminopropyltrimethoxysilane, and γ-isocyanatopropyltriethoxysilane.

3. The polyurethane pultrusion composite according to claim 1, wherein the silane modified polyisocyanate is the reaction product of an isocyanate functional urethane prepolymer and an organosilane.

4. The polyurethane pultrusion composite according to claim 3, wherein the isocyanate is selected from the group consisting of hexamethylene diisocyanate ("HDI"), 1-isocyanato-3,3,5-trimethyl-5-isocyanatomethyl-cyclohexane ("IPDI") homopolymers and combinations thereof.

5. The polyurethane pultrusion composite according to claim 3, wherein the organosilane is selected from the group consisting N,N'-bis((3-triethoxysily)propyl)amine, N, N'-bis (3-tripropoxysily)propylamine, N-(3-trimethoxysilyl)propyl-3-(N-(3-trimethoxysilyl)propylamino)propionamide, N-(3-triethoxysilyl)propyl-3-(N-(3-triethoxysilyl)propylamino)propionamide, N-(3-trimethoxysilyl)propyl-3-(N-(3-triethoxysilyl)propylamino)propionamide, 3-mercaptopropyltrimethoxysilane, 3-mercaptopropyltriethoxysilane, N,N'-bis(3-trimethoxysilyl)propyl)amine, N,N'-(bis(3-triethoxysilyl)propylamine, and ureidopropyltrimethoxysilane.

6. The polyurethane pultrusion composite according to claim 3, wherein the prepolymer includes a high solids polyester polyol.

* * * * *